United States Patent Office 3,300,113
Patented Jan. 24, 1967

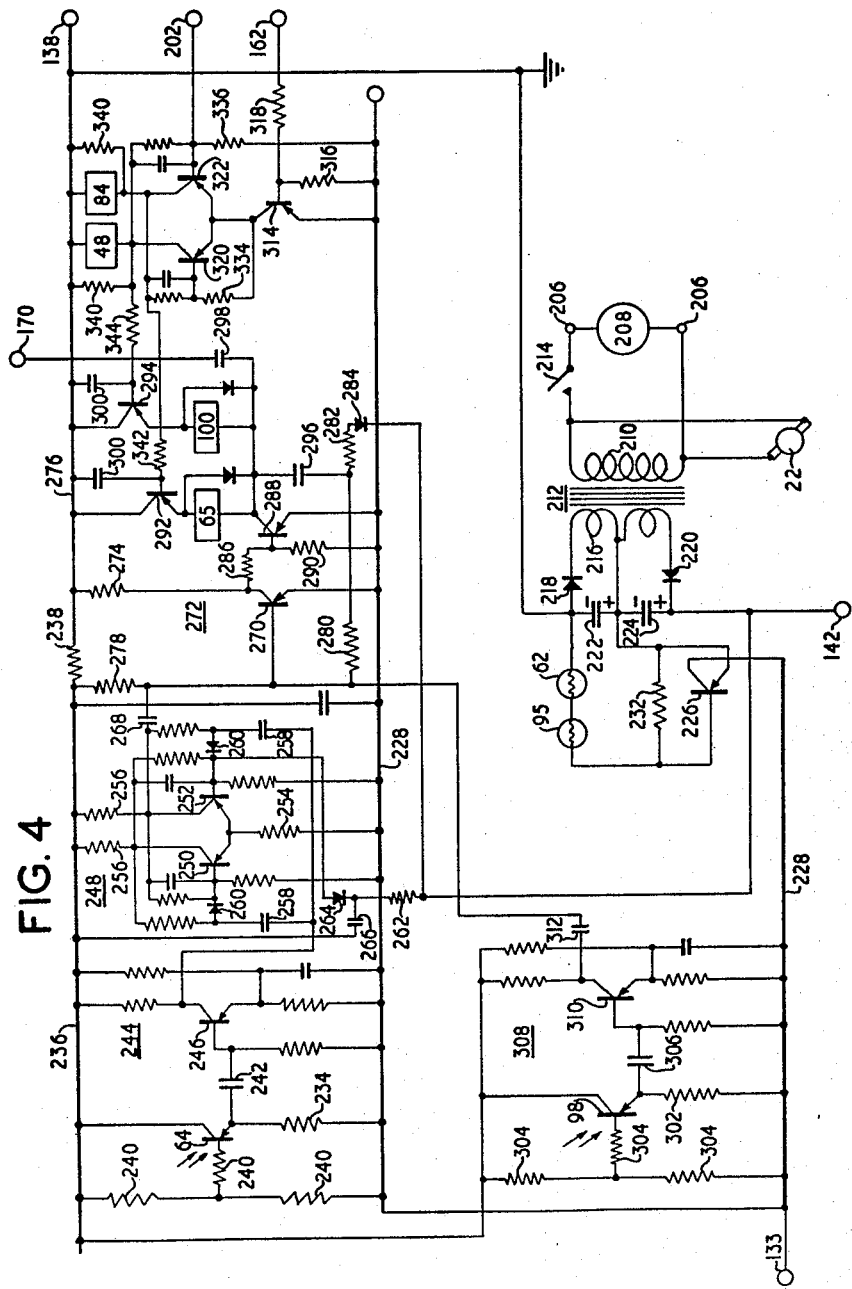

3,300,113
ELECTRIC STAMP ISSUING MECHANISM
Ronald George Lane, Billingshurst, England, assignor to The National Cash Register Company, Dayton, Ohio, a corporation of Maryland
Filed Oct. 19, 1964, Ser. No. 404,856
Claims priority, application Great Britain, Oct. 21, 1963, 41,450/63
9 Claims. (Cl. 226—110)

This invention relates to machines of the kind adapted to issue stamps, tickets, or the like in accordance with a monetary value; for the sake of simplicity, hereinafter in the specification and claims the term "stamps" alone will be used, but it should be understood that this term should be construed as embracing not only stamps, but also tickets, coupons, or other tokens the issue of which is related to a monetary value.

Machines of the kind specified may be employed, for example, in shops or stores in which a customer is given so-called trading stamps in relation to the amount of a purchase. Normally, it is required that a plurality of stamps of the same denomination should be issued in respect of a purchase, and thus in such machines means are provided for issuing the appropriate number of such stamps in relation to the purchase; by "stamps of the same denomination" are meant stamps each of which is related to the same monetary value when issued, even though they may not themselves have a fixed intrinsic value.

Machines of the kind specified are known in which the issue of stamps is controlled by mechanical or electromechanical means, but these known machines have the disadvantage that the control mecahnism is complicated and expensive.

It is an object of the present invention to provide a machine of the kind specified in which the means for controlling the issue of stamps is simplified structurally.

According to the invention, there is provided a machine adapted to issue stamps in accordance with a monetary value, including an electronic counter, means for setting the counter to a count corresponding to a monetary value, feeding means for issuing stamps of the same denomination from the machine, means for causing the counter to count towards a predetermined count as stamps are issued from the machine by said feeding means, each unit count of the counter corresponding to the issue of a predetermined number of stamps by said feeding means, and means for stopping the issue of stamps by said feeding means when the count of the counter reaches said predetermined count. It should be understood that said predetermined number may be "one."

One embodiment of the invention will now be described by way of example with reference to the accompanying drawings, in which:

FIGURE 4 is a circuit diagram of the remainder of the electrical circuitry employed in the machine of FIGURE 1.

The machine in accordance with the embodiment of the invention is adapted to issue one stamp for every sixpence of a total purchase, any pence left over when the value of the purchase is considered in units of sixpence being disregarded. The stamps are supplied in strips which are wound into rolls, the strips being perforated, so that individual stamps may be detached from a strip.

Figure 1:
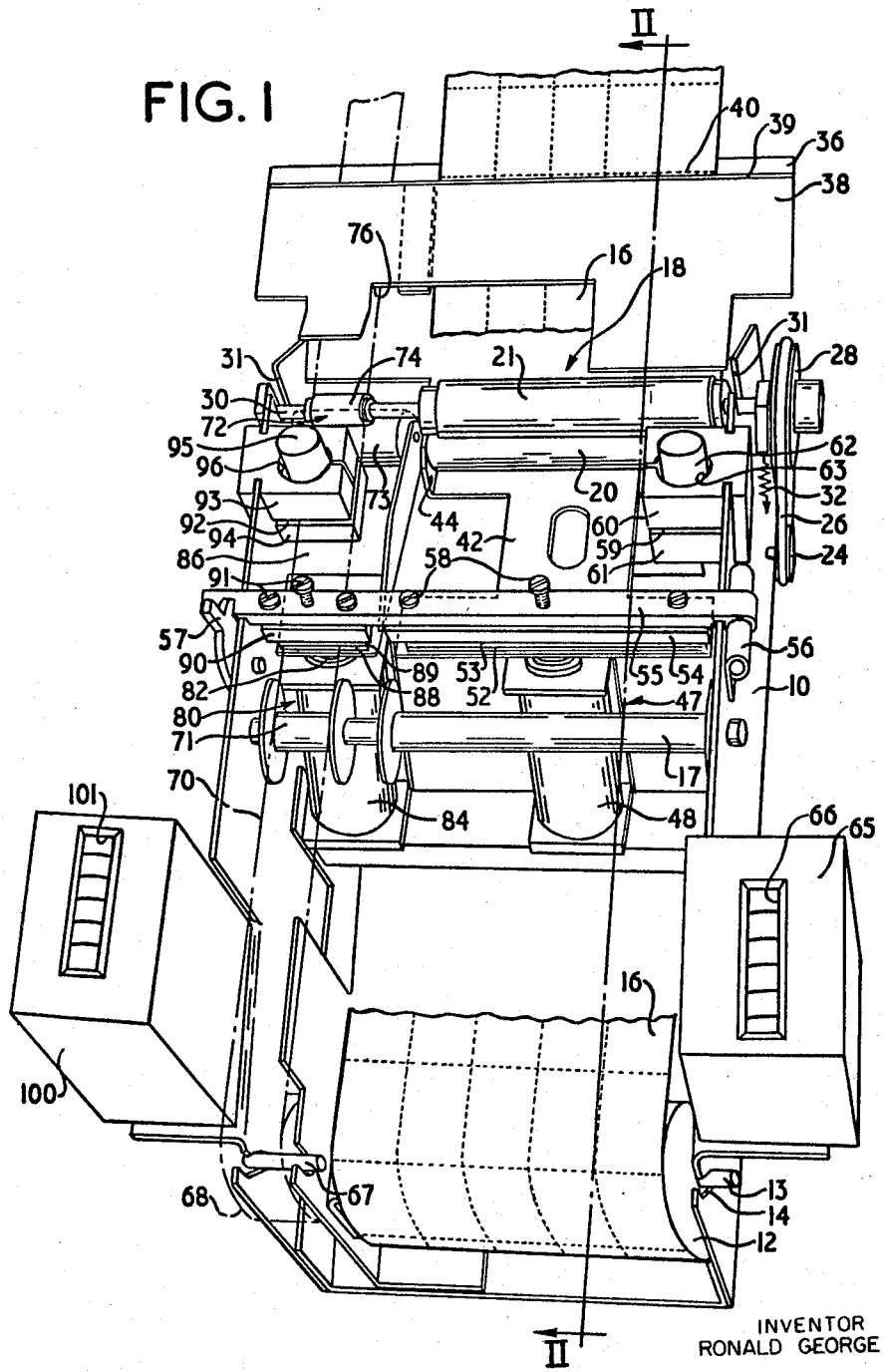
FIGURE 1 is a schematic top perspective view of the mechanical parts of a machine for issuing so-called trading stamps in accordance with the embodiment, the housing being removed for the sake of clarity.
Figure 2:
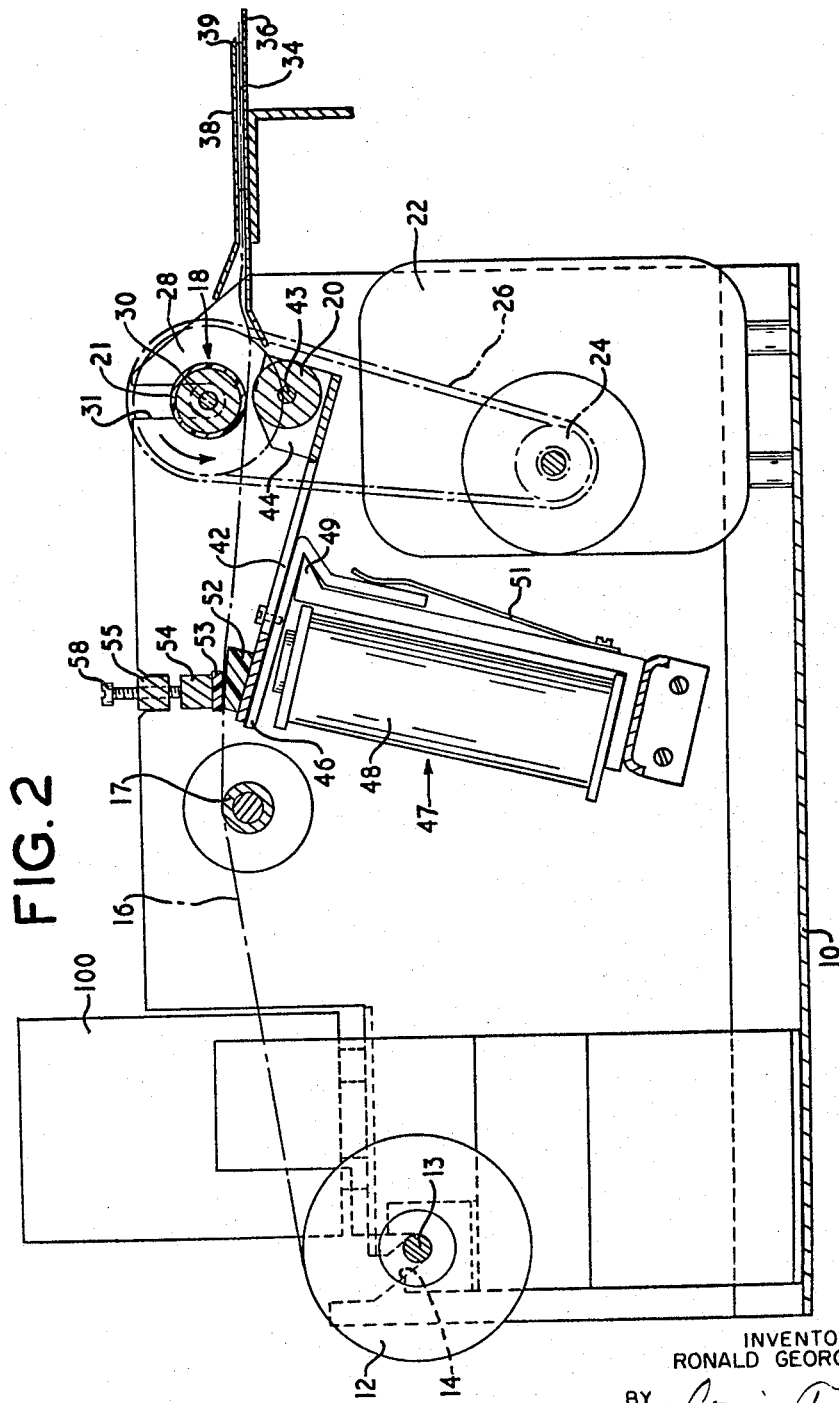
FIGURE 2 is a sectional side elevation of part of the machine of FIGURE 1, the section being taken along the line II—II of FIGURE 1.

Referring now to FIGURES 1 and 2, the machine in accordance with the embodiment includes a chassis 10, in which is accommodated a first roll 12 of stamps, five stamps wide, mounted on a spindle 13, the ends of the spindle 13 being respectively mounted in slots 14 formed in the chassis 10; the chassis 10 is mounted in a housing (not shown). The leading strip 16 of the roll 12 is fed over a guide rod 17 and between a drive roller 18 and a cooperating pressure roller 20 arranged beneath the drive roller 18, the roller 18 being provided with a rubber sleeve 21, which forms the driving surface of the roller 18. The roller 18 is continuously driven in operation, in the direction indicated by the arrow in FIGURE 2, by means of an electric motor 22, the drive from the motor 22 being transmitted to the roller 18 via a first pulley 24 driven by the motor 22, a drive belt 26, and a second pulley 28 secured on a spindle 30, on which is also mounted the roller 18. The ends of the spindle 30 are respectively mounted in slots 31 formed in the chassis 10, and the spindle 30 is resiliently held in the slots 31 by means of two downwardly-extending springs 32 (only one of which is seen).

The strip 16 also passes through a horizontal guideway 34, which is formed between two horizontal plates 36 and 38 disposed one above the other, the width of the guideway 34 being slightly greater than the width of the strip 16 and the spacing apart of the plates 36 and 38 being slightly greater than the thickness of the strip 16. The guideway 34 extends through the wall of the housing, so that the free end of the strip 16 emerges from the housing; that end of the upper plate 38 disposed outside the housing is formed as a bevelled edge 39, and the corresponding end of the lower plate 36 extends a short distance beyond the edge 39. The arrangement is such that, when the strip 16 is stationary, a row of perforations 40 occurs just beyond the edge 39, so that stamps which have issued from the housing can be readily detached from the strip 16 by being torn along the row of perforations 40 with the aid of the edge 39.

The pressure roller 20 is mounted at one end of an elongated metal plate 42, the spindle 43 of the roller 20 being mounted between two brackets 44 (only one of which is seen) formed integral with the plate 42. The other end of the plate 42 is secured to an armature 46 of an electromagnetic relay 47, a portion of the armature 46 being disposed immediately above the upper end of a generally vertical solenoid 48 of the relay 47; the plate 42 is pivoted about a horizontal knife-edge pivot 49 for the armature 46. If the solenoid 48 is not energized, the plate 42 is biased into the position shown in FIGURE 2 by means of a leaf-spring 51. With the plate 42 in this position, the pressure roller 20 is out of engagement with the drive roller 18, so that no feeding of the stamps takes place, and also the strip 16 is trapped between a first horizontal rubber clamping arm 52, secured to that end of the plate 42 adjacent the armature 46, and a second horizontal rubber clamping arm 53, which is adapted to be held in a fixed position relative to the chassis 10. The arm 53 is secured to the lower edge of a horizontal backing member 54, which is mounted on a horizontal support arm 55, the arm 55 being pivotally secured at one end to the chassis 10 by means of a hinge 56, and being normally locked in a fixed position relative to the chassis 10 by means of a latch 57; the support arm 55 is provided with adjusting screws 58 for the clamping arm 53. Thus, it will be appreciated that, while the solenoid 48 is not energized, the strip 16 is held firmly in position relative to the chassis 10, so that any stamps which have been fed out of the housing may be detached from the strip 16 without the risk of further stamps being pulled out of the housing.

When the solenoid 48 is energized, the armature 46 pivots counter-clockwise (with reference to FIGURE 2) about the pivot 49 against the pressure exerted by the spring 51, so that the plate 42 pivots into its operated position, in which the strip 16 is gripped between the continuously-rotating drive roller 18 and the pressure roller 20, and in which the strip 16 is released by the clamping arms 52 and 53. Thus, as soon as the solenoid 48 is energized, the strip 16 commences to feed through the guideway 34 out of the housing, and this feeding of the strip 16 continues until the solenoid 48 is de-energized.

The right-hand column of stamps (with reference to FIGURE 1) of the strip 16 passes through a gap 59 between upper and lower blocks 60 and 61 (see FIGURE 1), which are disposed between the drive roller 18 and the support arm 55. A small electric lamp, schematically indicated at 62 in FIGURE 1, is partially accommodated in an aperture 63 in the block 60, while a photo-transistor 64 (see FIGURE 4) is accommodated in a recess (not seen) formed in the block 61; the lamp 62 is disposed immediately above the photo-transistor 64, so that the direct passage of light from the lamp 62 to the photo-transistor 64 is blocked only by the right-hand column of the stamps of the strip 16. Thus, every time a row of perforations extending transversely to the length of the right-hand column of stamps of the strip 16 passes between the lamp 62 and the photo-transistor 64, light passes through these perforations and is incident upon the photo-transistor 64, the arrangement being such that the intensity of the light incident upon the photo-transistor 64 is sufficient to render the photo-transisor 64 conducting and thereby cause a pulse of current to be generated; this pulse is utilized in a manner to be described later. It should be understood that light from the lamp 62 incident upon the photo-transistor 64 passes through all the perforations of a transverse row of perforations of the right-hand column of stamps of the strip 16, so that a current pulse will be generated as such a row passes the lamp 62 even if, due to incorrect punching, paper remains at some of the positions which should correspond to perforations of this row.

The machine also includes a conventional electromagnetic counter 65; the count registered by the counter 65 is shown through a window 66 and is visible from outside the housing. As will be explained later, the count registered by the counter 65 is incremented by "one" for every second transverse row of perforations of the strip 16 which passes the lamp 62; thus, since the strip 16 is five stamps wide, each unit increment of this count indicates the issue of ten stamps from the roll 12.

Also accommodated in the chassis 10 is a second spindle 67, on which is mounted a second roll 68 of stamps, the roll 68 being only a single stamp wide. The leading strip 70 of the roll 68 is fed over a guide rod 71 and between a drive roller 72 and a cooperating pressure roller 73 arranged beneath the drive roller 72, the drive roller 72 being provided with a rubber sleeve 74 and being mounted on the spindle 30, on which the drive roller 18 is mounted. The strip 70 passes through a second guideway 76, which is also formed between the guide plates 36 and 38, the width of the guideway 76 being slightly greater than the width of the strip 70. As in the case of the strip 16, the arrangement is such that, when the strip 70 is stationary, a transverse row of perforations occurs just beyond the edge 39, so that stamps which have been issued by the machine from the roll 68 can be detached from the strip 70 by being torn along this row of perforations.

The feeding of stamps from the roll 68 is controlled in a manner similar to that in which the feeding of stamps from the roll 12 is controlled. The control means for the roll 68 includes an electromagnetic relay 80, which is similar to the relay 47, the relay 80 including a pivotal armature 82 and a generally vertically extending solenoid 84 disposed beneath a portion of the armature 82. The drive roller 72 is mounted at one end of an elongated metal plate 86, the other end of which is secured to the armature 82. The control means for the roll 68 also includes rubber clamping arms 88 and 89, which are respectively secured to the plate 86 and to a backing member 90; the member 90 is mounted on the support arm 55, and the arm 55 is provided with adjusting screws 91 for the clamping arm 89. The strip 70 is clamped by the arms 88 and 89 when the solenoid 84 is not energized, and is released by the arms 88 and 89 and fed forward by the drive roller 72 when the solenoid 84 is energized.

The strip 70 passes through a gap 92 between upper and lower blocks 93 and 94, which are disposed between the drive roller 72 and the support arm 55. A second small electric lamp, schematically indicated at 95 in FIGURE 1, is partially accommodated in an aperture 96 formed in the block 93, while a second photo-transistor 98 (see FIGURE 4) is accommodated in a recess (not seen) formed in the block 94; the lamp 95 is disposed immediately above the photo-transistor 98, so that the direct passage of light from the lamp 95 to the photo-transistor 98 is blocked only by the strip 70. A pulse of current is generated by the photo-transistor 98 each time a transverse row of perforations of the strip 70 passes the lamp 95.

The number of stamps fed from the roll 68 is counted by an electromagnetic counter 100, similar to the counter 65, the count registered by the counter 100 being shown through a window 101, which is also visible from outside the housing. It will be appreciated that, since the roll 68 is only one stamp wide, then each unit increment of the count of the counter 100 indicates the issue of a single stamp.

The number of stamps which are issued at any time from one or the other of the rolls 12 and 68 is controlled by a keyboard (not shown), the keys 106 and 108 (see FIGURE 3) of which each bear a different monetary value. The issue of stamps from the roll 12 is controlled by the keys 106, the monetary values indicated on which range from five shillings to seventy-five shillings in units of five shillings, while the issue of stamps from the roll 68 is controlled by the keys 108, the monetary values indicated on which range from sixpence to four and sixpence in units of sixpence. Disposed beneath the keyboard is an electronic binary counter 110 (see FIGURE 3), the construction and operation of which will be described in more detail later.

Briefly, the operation of the counter 110 and the keyboard is such that, each time a key 106 or 108 is depressed, a count is entered in the counter 110 depending on the monetary value corresponding to the key depressed. For example, depression of the lowest value key 106 (the 5/- key) causes the decimal number "1" to be entered in binary form in the counter 110, depression of the next lowest value key 106 (the 10/- key) causes the decimal number "2" to be entered in binary form in the counter 110, and so on; thus, depression of the highest value key 106 (the 75/- key) causes the decimal number "15" to be entered in binary form in the counter 110. Similarly, depression of the lowest value key 108 (the 6d key) causes the decimal number "1" to be entered in binary form in the counter 110, and so on. The operation of the machine is such that a decimal count entered in the counter 110 decreases by "one" each time the count registered by one or the other of the electromagnetic counters 65 and 100 increases by "one."

Upon a count being entered in the counter 110, the relevant solenoid 48 or 84 is energized, and the issue of stamps commences, but, as soon as the count in the counter 110 reaches zero, the solenoids 48 and 84 are de-energized, and the issue of stamps ceases. The control circuitry for controlling the operation of the solenoids 48 and 84 will be described later with reference to FIGURE 4. It should be understood that, if it is desired to issue stamps corresponding to a value which is greater than five shillings but which is not a multiple of units of five shillings, then it is necessary to carry out two separate stamp feed operations, one feed operation being initiated by depression of the appropriate key 106 and the other by depression of the approximate key 108; for example, stamps corresponding to the value of six shillings and sixpence may be issued by depression, first, of the 5/- key 106, so that ten stamps are issued from the roll 12, and then depression of the 1/6d key 108, so that three further stamps are issued from the roll 68.

Figure 3:
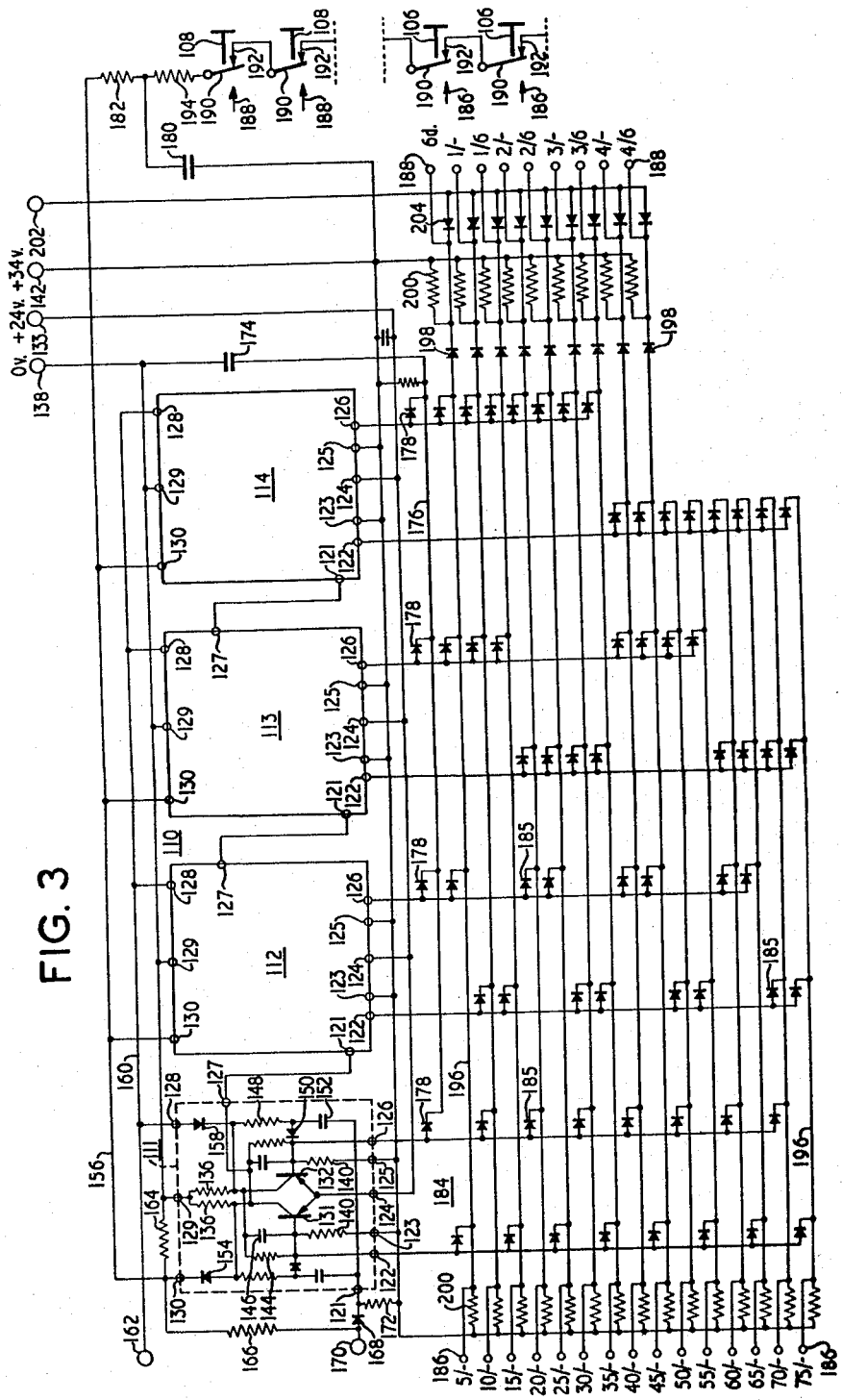
FIGURE 3 is a circuit diagram of an electronic counter and associated circuitry employed in the machine of FIGURE 1.

Referring now to FIGURE 3, the electronic counter 110 includes four flip-flops 111 to 114, arranged to operate as a binary counter, the lowest denomination binary digit of a number stored in the counter 110 being stored in the flip-flop 111, and the highest denomination binary digit being stored in the flip-flop 114; it should be understood that, in this specification, by the term "flip-flop" is meant a bistable device. The flip-flops 111 to 114 are all identical, and for the sake of simplicity each of the flip-flops 111 to 114 is considered as being provided with terminals 121 to 130 (except that the flip-flop 114 has no terminal 127).

Since the flip-flops 111 to 114 are all identical, only the flip-flop 111 will be described in detail. The flip-flop 111 includes a pair of P-N-P transistors 131 and 132, the emitters of which are connected together and are connected via the relevant terminal 124 to a positive supply terminal 133, the terminal 133 being held in operation at a potential of +24 volts. Each of the collectors of the transistors 131 and 132 is connected via a respective resistor 136 and the relevant terminal 129 to a further supply terminal 138, which is held at 0 volt. The base of each transistor 131 or 132 is connected via a respective resistor 140 and a respective terminal 123 or 125 to a third supply terminal 142, which is held in operation at a potential of +34 volts, and the base of each transistor 131 or 132 is also connected via a respective parallel combination of a resistor 144 and a capacitor 146 to the collector of the other transistor 132 or 131. The collector and the base of each transistor 131 or 132 are connected together via a respective resistor 148 and diode 150, the cathode terminal of the diode 150 being connected to the base; the anode terminal of each diode 150 is connected via a respective capacitor 152 to the relevant terminal 121. The collector of the transistor 131 is connected via a forwardly poled diode 154 to a line 156, while the collector of the transistor 132 is connected via a backwardly poled diode 158 to a line 160 having a terminal 162 at one end.

The line 156 is connected to the supply terminal 138 via a resistor 164, and is connected to the terminal 121 of the flip-flop 111 via a resistor 166 and a forwardly poled diode 168; the anode terminal of the diode is connected to a terminal 170, and the cathode terminal is connected via a resistor 172 to the supply terminal 142.

The collector electrode of the transistor 131 of the flip-flop 111 is connected via the relevant terminal 127 to the terminal 121 of the flip-flop 112; similarly, the terminal 127 of the flip-flop 112 is connected to the terminal 121 of the flip-flop 113, and the terminal 127 of the flip-flop 113 is connected to the terminal 121 of the flip-flop 114. Each of the flip-flops 111 to 114 is considered to be in the "0" state when the relevant transistor 132 is conducting and is considered to be in the "1" state when the transistor 131 is conducting. When one of the flip-flops 111 to 113 is in the "0" state, the relevant terminal 127 is at substantially 0 volt, and, when the flip-flop changes to the "1" state, the potential of the terminal 127 rises to substantially +24 volts. Thus, upon one of the flip-flops 111 to 113 changing from the "0" state to the "1" state, a positive pulse is applied to the terminal 121 of the next succeeding flip-flop, thereby causing this last-mentioned flip-flop to change state (since the terminal 127 of the former flip-flop is connected to the bases of the transistors 131 and 132 of the latter flip-flop via the capacitors 152 and the forwardly poled diodes 150 of the latter flip-flop). It will be appreciated, therefore, that the counter 110 is arranged to count backwards, and that a count set up in the counter 110 decreases by one binary digit each time a positive input pulse is applied to the terminal 170.

The bases of the transistors 131 and 132 of each of the flip-flops 111 to 114 are respectively connected to the relevant terminals 122 and 126; it will be appreciated that the application of a negative pulse to the base of the transistor 131 via the relevant terminal 122 sets the flip-flop to the "1" state, and that the application of a negative pulse to the base of the transistor 132 via the relevant terminal 126 sets the flip-flop to the "0" state.

A capacitor 174 is connected between the supply terminal 138 and a line 176, the line 176 being connected via a respective backwardly poled diode 178 to the terminal 126 of each of the flip-flops 111 to 114. One terminal of a further capacitor 180 is connected to the supply terminal 142, while the other terminal of the capacitor 180 is connected via a resistor 182 to the line 156. The purpose of the capacitors 174 and 180 will be made clear later.

The counter 110 is associated with a diode matrix 184 including an array of diodes 185 connected as shown in FIGURE 3, the terminals 122 and 126 of each of the flip-flops 111 to 114 being connected to the matrix 184. Also connected to the matrix 184 are a number of fixed contacts 186, which are respectively associated with the keys 106, and a number of fixed contacts 188, which are respectively associated with the keys 108, each of the contacts 186 and 188 being labelled in FIGURE 3 with the appropriate monetary value of the corresponding key 106 or 108. Each of the keys 106 and 108 is also associated with a respective movable contact 190 and a second fixed contact 192. With none of the keys 106 and 108 depressed, the movable contacts 190 are all connected in series with the fixed contacts 192, as shown in FIGURE 3. The first movable contact 190 in the series (which is the contact associated with the 6d key 108) is connected via a resistor 194 to the connection between the resistor 182 and the capacitor 180. The construction of the keys 106 and 108 and the associated contacts 186, 188, 190, and 192 is such that, upon depression of one of the keys 106 and 108, the relevant movable contact 190 is connected to the relevant fixed contact 186 or 188.

The contacts 186 are respectively connected to a number of lines 196, while the contacts 188 are respectively connected to nine of the lines 196 via backwardly poled diodes 198. Each of the contacts 186 and 188 is connetced to the supply terminal 142 via a respective resistor 200, and each of the contacts 188 is also connected to an output terminal 202 via a respective backwardly poled diode 204.

Each of the lines 196 is connected to one or the other of the terminals 122 and 126 of each of the flip-flops 111 to 114 via one of the diodes 185, the cathode terminal of the relevant diode 185 being connected to the relevant line 196. The terminals of the flip-flops 111 to 114 to which each line 196 is connected are determined by the binary coded representation of the monetary value corresponding to the or each key 106 or 108 with which the line 196 is associated. For example, the monetary value corresponding to the 5/- key 106 and the 6d key 108 is represented by the binary number 0001 (decimal 1). As has been explained previously, the flip-flop 111 of the counter 110 stores the lowest-denomination binary bit of a binary number, so that for the counter 110 to store the binary representation of five shillings or sixpence the flip-flop 111 should be in the "1" state, while the other flip-flops 112 to 114 should all be in the "0" state. Where a particular bit of a binary number corresponding to a particular line 196 is a "1," the line 196 is connected to the terminal 122 of the corresponding one of the flip-flops 111 to 114, and, where the bit is a "0," the line 196 is connected to the terminal 126 of the corresponding one of the flip-flops 111 to 114. Thus, the line 196 corresponding to the 5/- key 106 and to the 6d key 108 is connected to the terminal 122 of the flip-flop 111 and to the terminal 126 of each of the flip-flops 112 to 114. The monetary value represented by the 10/- key 106 and the 1/- key 108 is represented by the binary number 0010 (decimal number 2), so that the line 196 corresponding to these keys is connected to the terminal 122 of the flip-flop 112 and to the terminal 126 of each of the flip-flops 111, 113, and 114. Similarly, the monetary value represented by the 15/- key 106 and the 1/6d key 108 is represented by the binary number 0011; i.e., decimal number 3 (so that the line 196 corresponding to these keys is connected to the terminal 122 of each of the flip-flops 111 and 112 and to the terminal 126 of each of the flip-flops 113 and 114), and so on. In the case of the highest denominational key 106 (the 75/- key), for example, the corresponding binary number is 1111, so that the relevant line 196 is connected to the terminal 122 of each of the flip-flops 111 to 114.

Considering now the operation of the circuit so far described, upon the electricity supply for the machine being first switched on, the capacitor 174 commences to charge, the charging current for the capacitor 174 passing through each of the diodes 178 and thereby causing the transistor 132 of each of the flip-flops 111 to 114 to conduct. Thus, initially, the flip-flops 111 to 114 are all set to the "0" state. Since none of the transistors 131 are conducting initially, the line 156 is at 0 volt, thereby enabling the capacitor 180 to charge via the resistor 182 to its maximum voltage of 34 volts.

If now one of the keys 106 and 108 is depressed, the negative terminal of the capacitor 180 is connected to the relevant contact 186 or 188 via the resistor 194, and the capacitor 180 will partially discharge via the relevant diodes 185, thereby setting the flip-flops 111 to 114 to the appropriate states as determined by the connections of the diodes 185. For example, if the 5/- key 106 is depressed, the flip-flop 111 changes to the "1" state, while the flip-flops 112 to 114 all remain in the "0" state. After a key 106 or 108 has been depressed, the potential of the line 156 goes to +24 volts, since at least one of the transistors 131 is now conducting. The capacitor 180 will therefore not be able to recharge to its maximum value until all the flip-flops 111 to 114 return to their "0" states, so that, until this happens, the capacitor 180 is inoperative to set any further flip-flop to the "1" state.

Referring now to FIGURE 4, the power supply for the whole machine is provided from a pair of terminals 206, between which an alternating current source 208 is connected in operation. One of the terminals 206 is connected to one terminal of the primary winding 210 of a transformer 212, while the other terminal 206 is connectable via a main on-off switch 214 for the machine to the other terminal of the winding 210. The terminals of the motor 22 for the drive rollers 18 and 72 are connected to the terminals of the winding 210.

The voltage supplied by the secondary winding 216 of the transformer 212 is rectified by means of two diodes 218 and 220. The anode terminal of the diode 218 is connected to one terminal of a capacitor 222, while the cathode terminal of the diode 220 is connected to one terminal of a capacitor 224, the other terminals of the capacitors 222 and 224 being connected together and to an appropriate tapping of the winding 216. The anode terminal of the diode 218 is also connected to the terminal 138 (see also FIGURE 3), the terminal 138 being connected to ground, and the cathode terminal of the diode 224 is also connected to the terminal 142 (see also FIGURE 3).

The power supply circuit for the machine also includes a P-N-P transistor 226, the collector of which is connected to a positive line 228 and the emitter of which is connected to the positive terminal of the capacitor 222; the line 228 is connected to the terminal 133 (see also FIGURE 3). The negative terminal of the capacitor 222 is connected via the series connection of the two lamps 62 and 95 (see also FIGURE 1) to the base of the transistor 226. A resistor 232 is connected between the base and the emitter of the transistor 226. Provided that both lamps 62 and 95 are operative, a forward biasing voltage for the transistor 226 is established across the resistor 232, so that the transistor 226 conducts and the positive line 228 is effectively connected to the positive terminal of the capacitor 222. It will be appreciated that, in the event of one of the lamps 62 and 95 failing, the forward biasing voltage for the transistor 226 is removed, so that the transistor 226 no longer conducts, and the positive line 228 is disconnected from the supply voltage supplied by the capacitor 222; thus, the machine is rendered inoperative in the event of such a failure.

Considering now the circuit including the photo-transistor 64, the emitter of the photo-transistor 64 is connected via a resistor 234 to the positive line 228, while the collector is connected to a line 236, which is connected via a resistor 238 to the terminal 138. An appropriate biasing network for the base of the photo-transistor 64 is provided by means of resistors 240, and the arrangement is such that the photo-transistor 64 can be rendered conductive by the incidence upon it of light of appropriate intensity. The emitter of the photo-transistor 64 is connected via a capacitor 242 to the input of a conventional amplifying and limiting circuit 244, incorporating a P-N-P transistor 246. The output of the circuit 244 is taken from the collector of the transistor 246 and is applied to the input of a conventional flip-flop 248. The flip-flop 248 includes a pair of P-N-P transistors 250 and 252, the emitters of the transistors 250 and 252 being connected together and to the positive line 228 via a resistor 254, and each of the collectors being connected to the line 236 via a respective resistor 256. The flip-flop 248 is considered to be in the "0" state when the transistor 252 is conducting and is considered to be in the "1" state when the transistor 250 is conducting. The input to the flip-flop 248 is applied to the base of each of the transistors 250 and 252 via a respective capacitor 258 and forwardly poled diode 260.

The supply terminal 142 is connected via a resistor 262 and a backwardly poled diode 264 to the base of the transistor 252, while the connection between the diode 264 and the resistor 262 is connected to the line 236 via a capacitor 266. The purpose of the diode 264, the resistor 262, and the capacitor 266 is to insure that the flip-flop 248 is set to its "0" state upon the power supply for the machine being switched on. It will be appreciated that, upon the power supply being switched on, the capacitor 266 will charge, and the charging current for the capacitor 266 will render the transistor 252 conducting.

The collector of the transistor 252 is connected via a capacitor 268 to the base of a P-N-P transistor 270, which forms part of a pulse-shaping circuit 272. The emitter of the transistor 270 is connected to the positive line 228, the collector is connected via a resistor 274 to a ground line 276, which is connected to the terminal 138, and the base is connected to the line 236 via a resistor 278. The base of the transistor 270 is also connected to the supply terminal 142 via two resistors 280 and 282 and a forwardly poled clamping diode 284. The transistor 270 is normally conducting, but it will be momentarily rendered non-conducting whenever a positive pulse is applied to its base upon the flip-flop 248 changing from its "1" state to its "0" state.

The collector of the transistor 270 is connected via a resistor 286 to the base of a P-N-P transistor 288, which is adapted to act as a driver for the electromagnetic counters 65 and 100, the emitter of the transistor 288 being connected to the positive line 228 via a resistor 290. The transistor 288 is normally non-conducting, but is rendered conducting whenever the transistor 270 is rendered non-conducting.

The collector of the transistor 288 is connected to the ground line 276 via the counter 65 and the emitter-collector path of a P-N-P transistor 292, and is also connected to the line 276 via the counter 100 and the emitter-collector path of a P-N-P transistor 294. The collector of the transistor 288 is also connected via a capacitor 296 to the connection between the resistors 280 and 282, and via a capacitor 298 to the terminal 170 (see also FIGURE 3). A respective high valued capacitor 300 is connected between the collector and the base of each of the transistors 292 and 294.

In operation, the transistor 288 is rendered momentarily conducting in response to alternate pulses produced by the photo-transistor 64. The reason for this is that the flip-flop 248 produces a positive pulse at its output only when it changes from its "1" state to its "0" state. Since the flip-flop 248 is in its "0" state originally, the first pulse produced by the photo-transistor 64 causes the flip-flop 248 to change from its "0" state to its "1" state, so that the transistor 288 is not rendered conducting by this first pulse. Thus, it will be appreciated that the transistor 288 conducts in response to the second, fourth, sixth, etc., pulses produced by the photo-transistor 64.

Considering now the circuit including the photo-transistor 98, the emitter of the photo-transistor 98 is connected via a resistor 302 to the positive line 228, while the collector is connected to the line 236; an appropriate biasing network for the base of the photo-transistor 98 is provided by means of resistors 304. The emitter of the photo-transistor 98 is connected via a capacitor 306 to the input of an amplifying and limiting circuit 308, which incorporates a P-N-P transistor 310, the circuit 308 being identical with the circuit 244 associated with the photo-transistor 64. In the case of the circuit including the photo-transistor 98, the flip-flop 248 is by-passed, the output of the circuit 308 being applied via a capacitor 312 directly to the base of the transistor 270. Thus, in the case of the photo-transistor 98, a positive pulse is applied to the base of the transistor 270 to render the transistor 270 non-conducting each time the photo-transistor 98 is rendered conducting upon light of appropriate intensity being incident upon it.

The control circuitry for the solenoids 48 and 84 will now be described. This circuitry includes a P-N-P transistor 314, the emitter of the transistor 314 being connected to the positive line 228 and the base being connected via a resistor 316 to the line 228 and via a resistor 318 to the terminal 162 (see also FIGURE 3).

The control circuitry for the solenoids 48 and 84 also includes two further P-N-P transistors 320 and 322, which are connected to form a bistable circuit and the emitters of which are connected together and to the collector of the transistor 314. The base of the transistor 320 is connected via a resistor 334 to the collector of the transistor 314, while the base of the transistor 322 is connected via a resistor 336 to the line 228 and is also connected to the terminal 202 (see also FIGURE 3). The collectors of the transistors 320 and 322 are respectively connected to terminals of the solenoids 48 and 84, the other terminals of which are each connected to the ground line 276; a respective resistor 340 is connected in parallel with each solenoid 48 or 84. The collectors of the transistors 322 and 320 are also respectively connected via resistors 342 and 344 to the bases of the transistors 292 and 294.

The operation of the control circuitry for the electromagnetic counters 65 and 100 and the solenoids 48 and 84 will now be described. As has been explained previously, when the power supply for the machine is first switched on, the line 160 (FIGURE 3) is at +24 volts, so that the terminal 162, to which the base of the transistor 314 is connected, is at the potential of the line 228, with the result that the transistor 314 is non-conducting.

Assuming that one of the keys 106 is depressed, the electronic counter 110 will be set to the appropriate count representing the monetary value corresponding to the depressed key 106, so that one or more of the flip-flops 111 to 114 will be set to their "1" state, thereby driving the potential of the terminal 162 to 0 volt. The transistor 314 will therefore now conduct. Since the base of the transistor 320 is initially more negative with respect to the line 228 than is the base of the transistor 322 (the base of the transistor 320 being at the potential of the ground line 276, and the base of the transistor 322 being connected to an intermediate point on a potential divider connected between the ground line 276 and the positive line 228), the transistor 320 will conduct upon the transistor 314 being rendered conducting, while the transistor 322 is held non-conducting. The solenoid 48 will thereupon be energized, causing the stamps from the roll 12 to be fed forward out of the guideway 34. Since the transistors 320 and 314 are both conducting, the base of the transistor 294 is driven to the potential of the positive line 228, so that the transistor 294 is disabled from being rendered conducting when the transistor 288 conducts. On the other hand, the base of the transistor 292 is maintained at a negative potential with respect to the line 228, so that the transistor 292 is enabled to conduct when the transistor 288 conducts.

As the stamps feed out of the guideway 34, an output pulse is produced by the photo-transistor 64 each time a transverse row of perforations passes the photo-transistor 64. As has been explained previously, the second of these pulses to be produced causes a positive output pulse to be produced at the output of the flip-flop 248, causing the transistor 270 to be rendered non-conducting and the transistor 288 to be rendered conducting. Upon the transistor 288 being rendered conducting, a circuit is completed for the counter 65 via the emitter-collector paths of the transistors 288 and 292, and the counter 65 increases its count by "one." At the same time, a positive pulse is fed from the collector of the transistor 288 via the capacitor 298 to the terminal 170, and this pulse changes the state of the flip-flop 111 and thereby decreases by "one" the count set up in the counter 110. Similarly (assuming that the depressed key 106 was not the 5/- key), the fourth pulse produced by the amplifier 244 causes the electromagnetic counter 65 to increase its count by "one" and the electronic counter 110 to decrease its count by "one," and so on. Thus, alternate pulses produced by the photo-transistor 64 progressively increase the count registered by the counter 65 in units of "one" and progressively decrease the count set up in the counter 110 by units of "one," and this mode of operation continues until the count set up in the counter 110 returns to zero (i.e., when all the flip-flops 111 to 114 are in their "0" states). Upon this stage being reached, the potential at the terminal 162 returns to +24 volts, thereby rendering the transistor 314 non-conducting. The solenoid 48 is thereupon de-energized, so that the drive roller 18 ceases to feed stamps from the roll 12, and the strip 16 is clamped between the clamping arms 52 and 53. It will be appreciated that, at the termination of the feeding operation, the appropriate number of stamps corresponding to the monetary value represented by the depressed key 106 will have been issued from the machine.

After the count set up in the electronic counter 110 has returned to zero, the capacitor 180 will charge up again to its maximum value of voltage, and the machine is then ready to issue further stamps in response to the operation of a further one of the keys 106 and 108.

It will now be explained what happens when one of the keys 108 is depressed. The count of the electronic counter 110 is again set to the appropriate count representing the monetary value corresponding to the depressed key 108, and the potential at the terminal 162 will be driven to 0 volt, thereby rendering the transistor 314 conducting. This time, the negative terminal of the capacitor 180 is connected via the resistor 194, the relevant diode 204, and the terminal 202 to the base of the transistor 322, and the base of the transistor 322 is more negative with respect to the line 228 than is the base of the transistor 320 at the instant that the transistor 314 is rendered conducting. The transistor 322 is therefore rendered conducting while the transistor 320 is held non-conducting, so that this time the solenoid 84 is energized to cause stamps to be fed from the roll 68 out of the guideway 76. Since the transistor 322 is now conducting and the transistor 320 is non-conducting, the transistor 292 is disabled from conducting, while the transistor 294 is enabled to conduct upon the transistor 288 being rendered conducting.

As the stamps feed out of the guideway 76, an output pulse is produced by the photo-transistor 98 each time a row of perforations passes the photo-transistor 98. In this case, the flip-flop 248 is by-passed, so that each of the pulses produced by the photo-transistor 98 renders the transistor 288 conducting; thus, each such pulse causes the counter 100 to increase its count by "one" and the electronic counter 110 to decrease its count by "one." Stamps continue to be fed from the roll 68 until the count set up in the electronic counter 110 returns to zero, whereupon the solenoid 84 is de-energized, causing the feeding of stamps to cease. Once again, at the termination of the feeding operation, the appropriate number of stamps corresponding to the monetary value represented by the depressed key 108 will have been issued from the machine.

It should be understood that the purpose of the capacitors 300 is to insure that, upon the relevant solenoid 48 or 84 being de-energized at the end of a stamp-feeding operation, that transistor 322 or 320 which had been non-conducting during the feeding operation is not immediately enabled to conduct; otherwise there would be a risk that the non-counting counter 100 or 65 would share the last count of the other counter 65 or 100.

Also, it should be understood that the purpose of the resistor 166 (FIGURE 3) is to cause the diode 168 to be reversed-biased while all the flip-flops 111 to 114 are in their "0" state, so as to insure that the counter 110 will not be caused to count in the event of stamps being pulled out of the machine while the count of the counter 110 is at zero.

By way of a summary, a typical operation of the machine will now be described. It will be assumed that the power supply for the machine has already been switched on, and that it is desired to issue stamps from the machine corresponding to the purchase of two pounds, eleven shillings, and sixpence worth of goods. First of all, the key 106 corresponding to the value 50/- is depressed. The valve 50/- is represented by the binary number 1010 (decimal number 10), so that the flip-flops 111, 112, 113, and 114 will assume the states 0, 1, 0, 1, respectively. Since one of the keys 106 has been depressed the solenoid 48 will be energized, and the counter 65 will be enabled to count. Stamps will commence to be fed from the roll 12, and, immediately the first two rows of stamps have issued from the machine, the count of the counter 65 will have been increased by "one," while the count of the electronic counter 110 will have been decreased by "one"; thus, at this stage, the states of the flip-flops 111 to 114 will be 1, 0, 0, 1, respectively. Similarly, immediately after the first four rows of stamps have issued from the machine, the count of the counter 65 will have increased by "two" from its initial count, while the count of the counter 110 will have decreased by "two" from its initial count; thus, at this stage, the states of the flip-flops 111 to 114 will be 0001 (remembering that the flip-flop 114 registers the highest order binary digit).

The stamps are fed continuously from the machine until the count of the counter 110 reaches zero, whereupon the solenoid 48 is de-energized, thereby causing the feeding of stamps to be stopped and the strip 16 to be clamped. At the end of this first stamp-issuing operation, the count of the counter 65 will have increased by "ten." It will be remembered that each count of the counter 65 corresponds to the issue of ten stamps, so that an increment of "ten" of this count indicates that 100 stamps have so far been issued (i.e., twenty rows of five stamps each).

Next, the key 108 corresponding to the value 1/6d is depressed. The value 1/6d is represented by the binary number 0011 (decimal number 3), so that the flip-flops 111 to 114 assume the states 1, 1, 0, 0, respectively. This time, since one of the keys 108 has been depressed, the solenoid 84 will be energized, and the counter 100 will be enabled to count. Stamps will commence to be fed from the roll 68, and, for each stamp issued, the count of the counter 100 will increase by "one," while the count set up in the counter 110 will decrease by "one." The stamps continue to feed from the roll 68 until the count of the counter 110 again reaches zero (which will be after three stamps have been issued), whereupon the solenoid 84 will be de-energized, thereby causing the feeding of the stamps to be stopped and the strip 70 to be clamped. By the time the count of the counter 110 has returned to zero, the count of the counter 100 will have increased by "three," each count corresponding to the issue of a single stamp.

Thus, at the end of the second stamp-issuing operation, a total of fifty-three stamps will have been issued from the machine, fifty from the roll 12 and three from the roll 68. The stamps inside the machine are firmly clamped, so that the issued stamps may be detached by tearing along the lines of perforations adjacent the bevelled edge 39. A check can be made of the number of stamps which have been issued by noting the numbers indicated by each of the counters 65 and 100.

What is claimed is:

1. In a machine for dispensing stamps in accordance with a monetary value, the combination including
    (a) a first electronic counter including a series of flip-flops arranged to operate as a binary counter for storing electrical pulses representing a monetary value in binary form;
    (b) a second electronic counter including a series of flip-flops arranged to operate as a binary counter for counting the number of stamps dispensed;
    (c) a plurality of key members each representing a monetary value;
    (d) a first circuit means controlled by operation of any of said key members for generating and storing in said first electronic counter electrical pulses representing in binary form the monetary value of the key member operated;
    (e) means controlled by operation of any of said key members for feeding stamps of the same denomination from the machine;
    (f) means for generating a control pulse in response to the feeding of a predetermined number of stamps by said feeding means, said control pulse operating said first electronic counter to count towards a predetermined count and said second electronic counter to count the number of stamps dispensed;
    (g) and means controlled by said first electronic counter for stopping the feeding of stamps by said feeding means when said counter reaches the predetermined count.

2. The machine of claim 1 which includes stamps of the same denomination in the form of a strip, the strip being perforated to enable individual stamps to be detached from the strip and being a predetermined number of stamps in width, and in which said feeding means is adapted to feed the leading edge of the strip out of the machine, and in which said generating means includes a photo-sensitive device and a cooperating light source which are so arranged that the strip passes between said device and said source as stamps are issued by said feeding means and that light from said source can reach said device by passing through perforations in the strip, said photo-sensitive device being adapted to produce a control output pulse in response to the incidence on said device of light from said source passing through a row of perforations transverse to the length of the strip, second circuit means connected between said photo-sensitive device and said first electronic counter allowing the generated control output pulses from the device to control the flip-flops of the first electronic counter to count towards said predetermined count, each unit count of the counter corresponding to a predetermined number of said output pulses, and clamping means including an actuating member controlled by said first electronic counter when said counter has reached said predetermined count to clamp the strip, thereby preventing stamps included in the strip from being pulled from the machine.

3. A machine according to claim 2 including means for rendering said feeding means inoperative in the event of said light source failing to operate.

4. A machine according to claim 2 in which said feeding means includes two rolls one of which is continuously driven and between which the strip passes in operation, the arrangement being such that when said feeding means is operative to issue stamps the rolls are urged together so as to grip the strip between them, and the machine including means for urging the rolls apart so as to release the strip and thereby stop the issue of stamps by said feeding means when said first electronic counter reaches said predetermined count.

5. A machine according to claim 4, including a solenoid associated with a pivotable armature which is pivoted into either a first position or a second position depending on whether the solenoid is energized or de-energized, one of the rolls being mounted on the armature and the arrangement being such that when the armature is in one position the strip is gripped between the two rolls and that when the armature is in the other position the strip is released by the two rolls.

6. A machine according to claim 1, in which corresponding terminals of the flip-flops of said first electronic counter are connected to a common line, and in which when the first electronic counter is at said predetermined count the flip-flops are each in a first state, the line being at a first potential when the flip-flops are each in said first state, and being at a second potential when at least one of the flip-flops is in its second state, and the machine including control means responsive to the potential of said line for controlling the issue of stamps by said feeding means, said control means being arranged to cause the issue of stamps by said feeding means to commence in response to the potential of said line changing from said first potential to said second potential, and being arranged to cause the issue of stamps by said feeding means to stop in response to the potential of said line changing from said second potential to said first potential.

7. A machine according to claim 6 in which the machine is adapted to contain a second strip of stamps of the same denomination, the machine including second feeding means for issuing stamps from the second strip, and means for insuring that stamps can only be issued from one of the strips following the setting of the first electronic counter to a count corresponding to a monetary value, the issue of stamps from either one of the strips being arranged to be stopped when the count of the first electronic counter reaches said predetermined count.

8. A machine according to claim 7, in which the number of stamps corresponding to the width of one strip is different from the number of stamps corresponding to the width of the other strip.

9. A machine according to claim 8, in which the second strip is associated in operation with a second photo-sensitive device and cooperating light source which are so arranged that the strip passes between said second device and the associated light source as stamps are issued by the second feeding means, and that light from the associated light source can reach said second device by passing through perforations in the second strip, said second device being adapted to produce a control output pulse in response to the incidence on said second device of light from the associated source passing through a row of perforations transverse to the length of the second strip, and control means for causing said first electronic counter to count towards said predetermined count in response to output pulses produced by said second device, each unit count of said first electronic counter corresponding to a predetermined number of the output pulses produced by the second device, said predetermined number of output pulses produced by said second device being different from said predetermined number of output pulses produced by the first photo-sensitive device.

References Cited by the Examiner

UNITED STATES PATENTS

| | | | |
|---|---|---|---|
| 2,264,647 | 12/1941 | Stearns | 226—135 X |
| 2,964,313 | 12/1960 | Zeigle | 226—135 X |
| 2,994,464 | 8/1961 | Krueger | 226—135 |
| 3,015,426 | 1/1962 | Dietz et al. | 226—135 X |
| 3,084,840 | 4/1963 | Stansell | 226—135 X |
| 3,125,269 | 3/1964 | McGraw et al. | 226—135 X |
| 3,130,887 | 4/1964 | Campbell et al. | 226—110 X |
| 3,165,248 | 1/1965 | Jones | 226—135 X |
| 3,212,692 | 10/1965 | Arp | 226—135 X |

M. HENSON WOOD, JR., *Primary Examiner.*

ALLEN N. KNOWLES, *Examiner.*